Feb. 2, 1943.   W. F. SKEATS   2,310,126
HIGH FREQUENCY CURRENT SHUNT
Filed July 10, 1941

Inventor:
Wilfred F. Skeats,
by Harry E. Dunham
His Attorney.

Patented Feb. 2, 1943

2,310,126

UNITED STATES PATENT OFFICE 2,310,126

HIGH FREQUENCY CURRENT SHUNT

Wilfred F. Skeats, Lansdowne, Pa., assignor to General Electric Company, a corporation of New York Application July 10, 1941, Serial No. 401,798

5 Claims. (Cl. 171—95)

My invention relates to shunts by means of which a small current proportional to a large current may be obtained for measuring and control purposes and in particular it relates to shunts which are accurate at extremely high rates of change of the current to be measured.

In many cases shunts are employed for current measurement purposes where at times the rate of change of current is large. For example, in the testing of circuit breakers where currents of short circuit magnitude down to zero are involved it is desirable to measure the current accurately without distortion, particularly in the neighborhood of zero current. In order to do this the time constants of the shunt and shunt lead measurement circuit must be the same. This requires that the inductance and skin effect of the parallel circuits must be balanced. It is a fairly simple matter to balance the inductance of the parallel circuits and my invention relates primarily to a shunt of large capacity designed to have its skin effect reduced to a value where it can balance the normally small skin effect of the shunt lead circuit.

By means of these precautions the current in the shunt lead circuit remains in phase with and is at all times proportional to the current through the shunt.

Figure 1:
Figure 2:
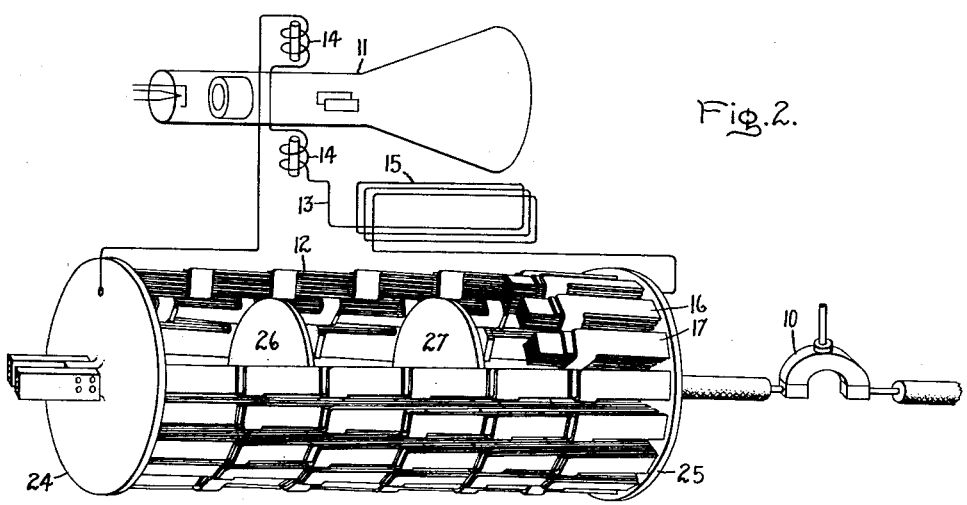
Figure 3:
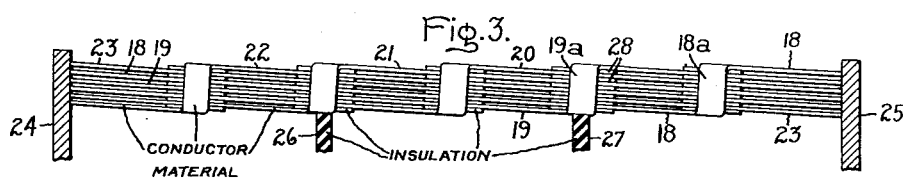
Figure 4:
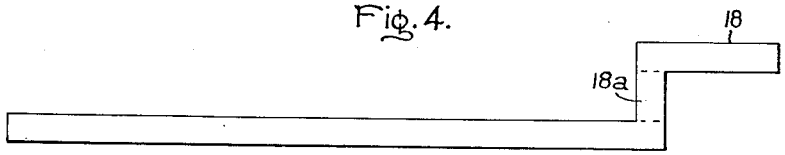
Figure 5:
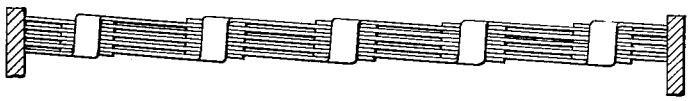

The features of my invention which are believed to be novel and patentable will be pointed out in the claims appended hereto. For a better understanding of my invention reference is made in the following description to the accompanying drawing in which Fig. 1 shows a form of cylindrical shunt embodying some of the features of my invention; Fig. 2 represents a perspective view of a preferred form of shunt, partially in section, and connections thereto for measuring the current in a circuit breaker testing circuit by means of a cathode ray oscillograph; Fig. 3 shows a side view of a shunt section made up of laminations which are transposed at different points; Fig. 4 represents one of the laminations before being bent for transposition purposes, and Fig. 5 shows shunt section with symmetrical transposing of the shunt laminations.

In Fig. 2 of the drawing the circuit breaker 10 and the cathode ray oscillograph 11 are not shown in detail, but it will be understood that my improved shunt 12 is here represented as connected in a testing circuit in series with the circuit breaker 10 to obtain a measurement of the current through the circuit breaker by means of the cathode ray oscillograph. Provision is usually made to measure the voltage across the circuit breaker during its operation in opening the circuit and it is desirable to have current and voltage measurement records in precise and accurate time relation with respect to each other. This is a further reason to obtain a current measurement record without distortion. The shunt measurement circuit 13 which is connected across the shunt 12 is connected across plates or coils for deflecting the cathode ray along one axis in proportion to the current measurement. In this case I have represented the shunt instrument circuit as including iron core coils 14 for producing electromagnetic deflection of the cathode ray. At 15 I have shown a coil in the shunt measurement circuit which will be so positioned relative to the main circuit as to properly balance the inductance of the two parallel circuits. The coil 15 may be merely a few convolutions of the shunt lead or leads in the magnetic field of the power circuit or may simply represent such a disposition of the shunt leads relative to the main circuit that the ratio of mutual inductance to mutual resistance of the shunt and metering circuits is equal to the ratio of self-inductance to resistance of the metering circuit in order that there will be no relative phase shift of the currents in the two circuits. This feature per se is not new but alone it is not sufficient for correct current reproduction in the metering circuit where sudden current changes are involved. It is also necessary that the skin effect in the shunt and metering circuits be balanced. Otherwise within say two or three micro-seconds after a sudden current change the shunt, for instance, might have an impedance much higher than normal and the metering circuit an impedance only slightly higher than normal. This might cause the change to be magnified several times in its representation in the metering circuit.

In general high current shunts heretofore used have large relative skin effects as compared to that of the metering circuit and my invention relates to a shunt having its skin effect reduced to a low value such as to substantially balance the small skin effect of the metering circuit. Skin effect is that tendency of a high frequency current or a current having an equivalent rapid change in magnitude to flow on the outside of a conductor. When the rate of change of the current is low the current distributes itself more uniformly through the conductor. Hence a conductor having skin effect acts like a variable resistance which is high with high frequency currents and low with low frequency currents. Obviously both the shunt and its parallel metering circuit must act alike in this respect and have their apparent resistance ratio remain constant if proportional current division is to be obtained.

The skin effect may be reduced by making the shunt in the form of a thin walled cylinder such as shown in Fig. 1 where the shell is less than $\frac{1}{8}$ inch in thickness and the cylinder a foot or more in diameter. However, with such an arrangement employing practicable dimensions, the skin effect of the shunt is still far too large for many applications. According to my invention I provide a shunt structure made of conducting material which is generally cylindrical in form and is hollow but the shell is slit into parallel sections and these sections are laminated and the laminations transposed in such a way that the average radial position of the different laminations is the same and the radial current distribution in the shell wall is required to be substantially uniform regardless of the rate of change of current.

Such a shunt is represented in Fig. 2. The cylindrical part is made up of closely circumferentially spaced parallel sections 16, 17, etc. Each section is made up of a stack of conductor laminations or strips 18, 19, etc., stacked radially and insulated from each other but so transposed at different points along their length that an outer lamination at one point becomes an inner lamination at another point and an intermediate lamination at various other points. The transposing of each lamination in a stack progresses uniformly such that the average radial position of all of the laminations is the same. Hence high frequency currents or currents having a high rate of change flowing through the shunt are forced to distribute themselves uniformly between the several laminations. In this way I am enabled to provide a shunt having the required high current carrying capacity but having the required low skin effect. The laminations may be made appreciably thinner than as represented in the drawing. As shown in Fig. 3 there are six laminations in the stack. Lamination 18 starts out from the right as the outer lamination but is folded under the stack at 18a to become the inner lamination. Lamination 19 starts out at the right as the next to the outer lamination and becomes the outer lamination at the point 18a where lamination 18 is transposed, and lamination 19 is in turn folded under at 19a to become the innermost lamination, thereby making lamination 18 the next to the inner lamination. It will be noted that measuring from the right, lamination 18 is transposed at $1/6$ of its length, lamination 19 at $2/6$ of its length, lamination 20 at $3/6$ of its length, lamination 21 at $4/6$ of its length and lamination 22 at $5/6$ of its length. Lamination 23, while it is not folded under at any point, is nevertheless transposed progressively from bottom to top of the stack because of the transposing of the other laminations.

Fig. 4 shows a plan view of lamination 18 before being folded at 18a. The opposite ends of the various laminations are brazed to the metal conductor end plates 24 and 25 comprising the shunt terminals and end supporting plates. The connectors for the main circuit connections are preferably at the centers of the end plates as shown in Fig. 2 and the end plates have provisions for connecting instrument shunt leads thereto. The laminations are also supported as needed at intermediate points by inner supporting disks 26 and 27. Opposite the supporting disks 26 and 27 and elsewhere as needed insulation material 28 is molded or otherwise inserted between the laminations to assist in forming a solid supporting structure for the lamination shunt. The diameter of the shunt and the number and dimensions of the laminations will vary with shunts of different current carrying capacity and the extent of skin effect elimination required. In other respects the shunt will be designed in accordance with good practice. For example, it will preferably be made of conductor material having a negligible temperature coefficient of resistance. The structure is such as to provide a large cooling surface and good ventilation.

In Fig. 5 I have shown a portion of a shunt having five laminations all of which have a transposing point, the transposing points being at $1/10$, $3/10$, $5/10$, $7/10$ and $9/10$ distant from one end. This shunt section is slightly more completely symmetrical than the section shown in Fig. 3.

What I claim as new and desire to secure by Letters Patent of the United States, is:

1. A current shunt comprising a hollow cylindrical structure of conducting material having conductor material across each end partially supporting the cylindrical portion and forming the shunt terminals, the cylindrical portion being formed of a plurality of circumferentially spaced sections, each section comprising a stack of laminations stacked radially and insulated from each other, the laminations of a stack being transposed with respect to each other in such a way that the laminations all have substantially the same average radial disposition in said cylindrical structure.

2. A current shunt comprising a hollow cylindrical structure of conducting material having conductor end walls forming the shunt terminals and supporting structure for the cylindrical portion, the cylindrical portion being slit into closely circumferentially spaced sections, each section being formed of a stack of thin conductor laminations stacked radially, the laminations in a stack being radially transposed so that the average radial position of each such lamination is substantially the same whereby the radial distribution of current flow in the shunt is caused to be substantially uniform, regardless of the frequency of the current through the shunt.

3. A high frequency current shunt, an instrument circuit connected in parallel therewith, the shunt having a small fraction of the resistance of the instrument circuit, said shunt and parallel connected instrument circuit having balanced skin effects such that the apparent resistance ratio of shunt and instrument circuit remains practically constant and is substantially independent of the rate of change of current flowing through the shunt.

4. A high frequency shunt, a measurement circuit having leads connected across said shunt to obtain a measurement current which is a small fraction of the current flow through the shunt, the ratio of mutual inductance to mutual resistance of the shunt and measurement circuits being substantially equal to the ratio of self-inductance to resistance of the measurement circuit and the skin effect of the shunt and measurement circuits being balanced.

5. A current shunt comprising a hollow cylindrical part of conducting material and end parts of conducting material forming the shunt terminals and serving as supporting structure for the cylindrical part, the cylindrical part being slit into a plurality of closely circumferentially spaced sections, each section being formed of a plurality of radially stacked laminations insulated from each other, each lamination of a stack having progressively different radial positions in such stack over the length of the shunt such that the average radial position of all laminations is the same and supporting structure within said shunt to prevent collapse of the cylindrical part when current flows therethrough.

WILFRED F. SKEATS.